US010986222B2

(12) United States Patent
Kim et al.

(10) Patent No.: US 10,986,222 B2
(45) Date of Patent: Apr. 20, 2021

(54) ELECTRONIC DEVICE FOR CONTROLLED TRANSMISSION OF VOICE DATA PACKET AND METHOD THEREOF

(71) Applicant: SAMSUNG ELECTRONICS CO., LTD., Suwon-si (KR)

(72) Inventors: Songkyu Kim, Suwon-si (KR); Yongwoon Moon, Suwon-si (KR); Insoo Lee, Suwon-si (KR); Junehee Lee, Suwon-si (KR); Sungho Seo, Suwon-si (KR); Kwangjae Woo, Suwon-si (KR); Youngil Chang, Suwon-si (KR); Bonggoo Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 16/229,540

(22) Filed: Dec. 21, 2018

(65) Prior Publication Data

US 2019/0199841 A1 Jun. 27, 2019

(30) Foreign Application Priority Data

Dec. 22, 2017 (KR) .................... 10-2017-0178730

(51) Int. Cl.
*H04M 1/253* (2006.01)
*H04L 29/06* (2006.01)
(Continued)

(52) U.S. Cl.
CPC ...... *H04M 1/2535* (2013.01); *H04L 65/1059* (2013.01); *H04L 65/1069* (2013.01);
(Continued)

(58) Field of Classification Search
CPC .......... H04M 1/72519; H04M 1/2535; H04M 7/006; H04L 65/1069; H04L 65/1059
See application file for complete search history.

(56) References Cited

U.S. PATENT DOCUMENTS

| 8,718,726 B2 | 5/2014 | Shukla et al. |
| 9,253,664 B2 | 2/2016 | Shukla et al. |
| (Continued) | | |

FOREIGN PATENT DOCUMENTS

| KR | 10-2008-0019349 | 3/2008 |
| KR | 10-2008-0019349 | 3/2013 |
| WO | 2017-190232 | 11/2017 |

OTHER PUBLICATIONS

International Search Report dated Apr. 25, 2019 in counterpart International Patent Application No. PCT/KR2018/016513.

*Primary Examiner* — Syed Ali
(74) *Attorney, Agent, or Firm* — Nixon & Vanderhye P.C.

(57) ABSTRACT

An electronic device is provided. The electronic device includes a display, at least one communication circuit, and at least one processor configured to control the display and the at least one communication circuit. The at least one processor is configured to obtain a communication state using the at least one communication circuit during a packet based voice call, and to stop transmitting data associated with at least one of a plurality of background applications which operate in a background of an operating system (OS) of the electronic device when the communication state meets a specified first condition.

14 Claims, 9 Drawing Sheets

(51) Int. Cl.
 *H04M 7/00* (2006.01)
 *H04M 1/725* (2021.01)
(52) U.S. Cl.
 CPC ...... *H04L 65/608* (2013.01); *H04M 1/72519* (2013.01); *H04M 7/006* (2013.01); *H04M 1/72563* (2013.01)

(56) References Cited

U.S. PATENT DOCUMENTS

| | | | | |
|---|---|---|---|---|
| 9,465,661 | B2* | 10/2016 | Kim | G06F 9/5022 |
| 10,380,378 | B2* | 8/2019 | Lee | H04L 63/04 |
| 10,609,276 | B2* | 3/2020 | Lee | H04N 5/23216 |
| 10,795,720 | B2* | 10/2020 | Choi | G06F 9/50 |
| 2008/0085717 | A1* | 4/2008 | Chhabra | H04L 47/10 455/450 |
| 2013/0094371 | A1 | 4/2013 | Vallath et al. | |
| 2013/0244636 | A1* | 9/2013 | Shukla | H04W 28/0242 455/418 |
| 2014/0082697 | A1 | 3/2014 | Watfa et al. | |
| 2014/0241172 | A1 | 8/2014 | Shukla et al. | |
| 2015/0188599 | A1* | 7/2015 | Shi | H04L 1/18 455/78 |
| 2015/0351074 | A1* | 12/2015 | Vyas | H04W 68/005 455/414.2 |
| 2015/0365996 | A1* | 12/2015 | Lee | H04L 43/0852 370/332 |
| 2016/0021563 | A1 | 1/2016 | Khay-Ibbat et al. | |
| 2016/0143087 | A1* | 5/2016 | Nam | H04W 76/28 455/422.1 |
| 2016/0150450 | A1* | 5/2016 | Balasubramanian | H04W 36/14 370/331 |
| 2016/0242045 | A1 | 8/2016 | Shukla et al. | |
| 2019/0124559 | A1* | 4/2019 | Brown | H04W 36/0085 |
| 2019/0150060 | A1* | 5/2019 | Lovlekar | H04W 4/90 455/418 |

* cited by examiner

ELECTRONIC DEVICE FOR CONTROLLED TRANSMISSION OF VOICE DATA PACKET AND METHOD THEREOF

CROSS-REFERENCE TO RELATED APPLICATION

This application is based on and claims priority under 35 U.S.C. § 119 to Korean Patent Application No. 10-2017-0178730, filed on Dec. 22, 2017, in the Korean Intellectual Property Office, the disclosure of which is incorporated by reference herein its entirety.

BACKGROUND

1. Field

The present disclosure relates to an electronic device for controlling transmission of a voice data packet and a method thereof.

2. Description of Related Art

Voice over Internet protocol (VoIP) technology based on an Internet protocol (IP) has been widely used to enhance the sound quality and efficiency of voice calls over a conventional circuit switched network. Contrary to a circuit switched mode, voices may be exchanged through data packets using voice calls based on the VoIP technology. Data capacity may increase in efficiency and voice data may increase in quality by using packetized voice data. The VoIP technology may be applied to various network platforms based on a packet data network. For example, voice over long term evolution (VoLTE) may be used for a VoIP in LTE wireless communication.

The above information is presented as background information only to assist with an understanding of the present disclosure. No determination has been made, and no assertion is made, as to whether any of the above might be applicable as prior art with regard to the present disclosure.

In conventional VoIP communication such as VoLTE, transmission and reception of a packet for a voice call may be performed independently of transmission and reception of a packet for data communication. For example, when a terminal transmits and receives a packet in an area with a poor communication environment, there may be a low possibility that a packet will be successfully transmitted or received. In this case, a communication rate of a packet for a voice call may be kept constant, but the communication rate may increase due to data transmission and reception. Furthermore, increasing in the communication rate may result in loss of more packets.

SUMMARY

Aspects of the present disclosure address at least the above-mentioned problems and/or disadvantages and to provide at least the advantages described below. Accordingly, an example aspect of the present disclosure is to provide a method for ensuring quality of a packet based voice call by limiting transmission and reception of a data packet associated with a specific application and an electronic device thereof.

In accordance with an aspect of the present disclosure, an electronic device is provided. The electronic device may include a display, at least one communication circuit, and at least one processor configured to control the display and the at least one communication circuit. The at least one processor may be configured to verify a communication state using the at least one communication circuit during a packet based voice call and, stop transmitting data associated with at least one of a plurality of background applications which operate in a background of an operating system (OS) of the electronic device when the communication state meets a specified first condition.

In accordance with another aspect of the present disclosure, a method for controlling transmission of data is provided. The method may include verifying a communication state during a packet based voice call and stopping transmitting data associated with at least one of a plurality of background applications which operate in a background of an OS of the electronic device, when the communication state meets a specified first condition.

According to various embodiments disclosed in the present disclosure, the electronic device may prevent and/or reduce a voice call from deteriorating in quality by blocking transmission of data depending on a communication environment.

According to various embodiments, the electronic device may control data transmission and reception matched with an intention of a user by blocking transmission of data associated with a background application.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Hereinafter, various example embodiments of the present disclosure may be described with reference to accompanying drawings. Accordingly, those of ordinary skill in the art will recognize that various modifications, equivalents, and/or alternatives on the various embodiments described herein can be variously made without departing from the scope and spirit of the present disclosure.

Figure 1:
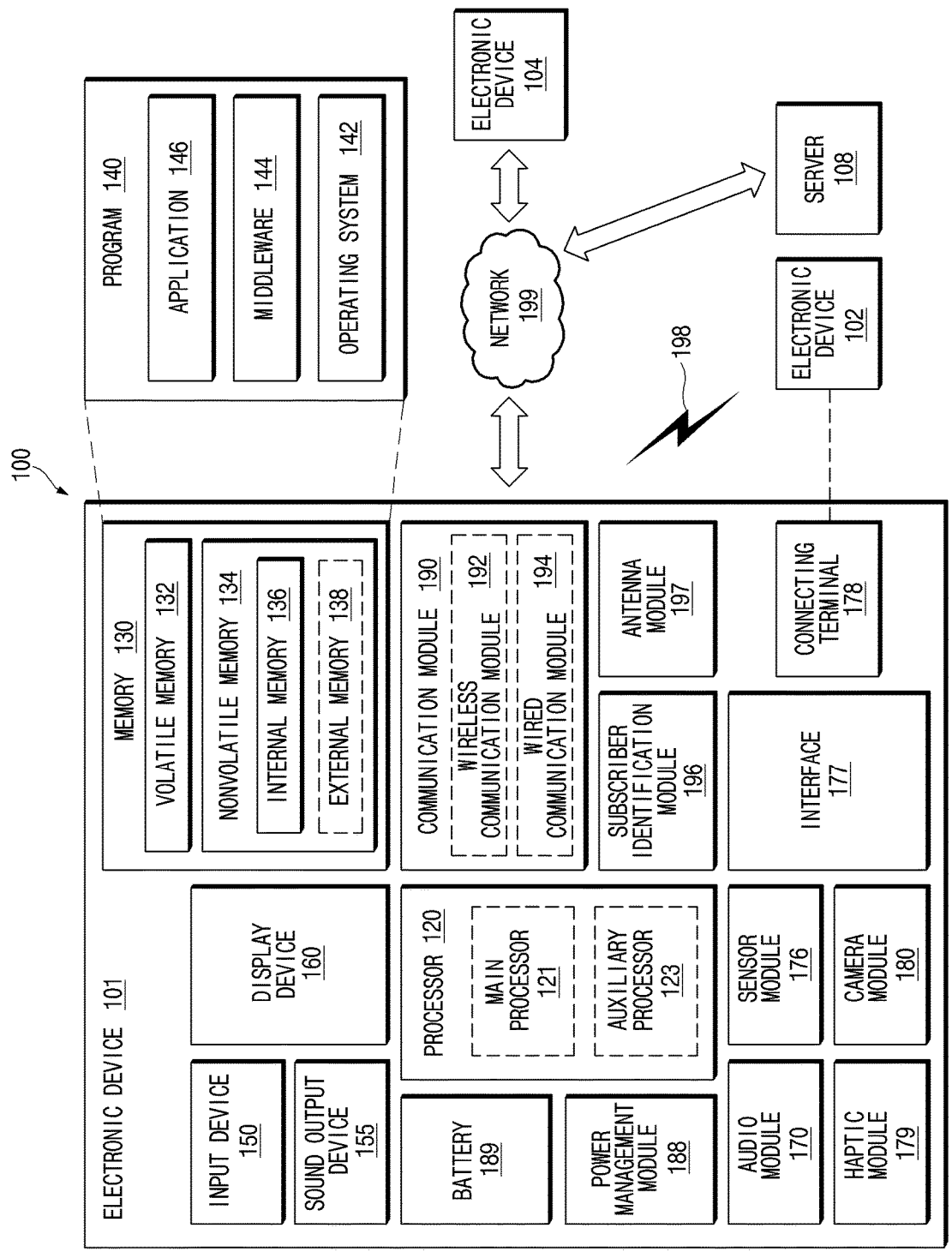
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120 and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In various example embodiments described below, various operations of the electronic device 101 may be performed by the processor 120. For example, the processor 120 may control operations of the electronic device 101 based on instructions stored in the memory 130.

Hereinafter, a description will be given of a long term evolution (LTE) mobile communication system according to an example embodiment, in which the electronic device 101 performs a packet based voice call, with reference to FIG. 2.

Figure 2:
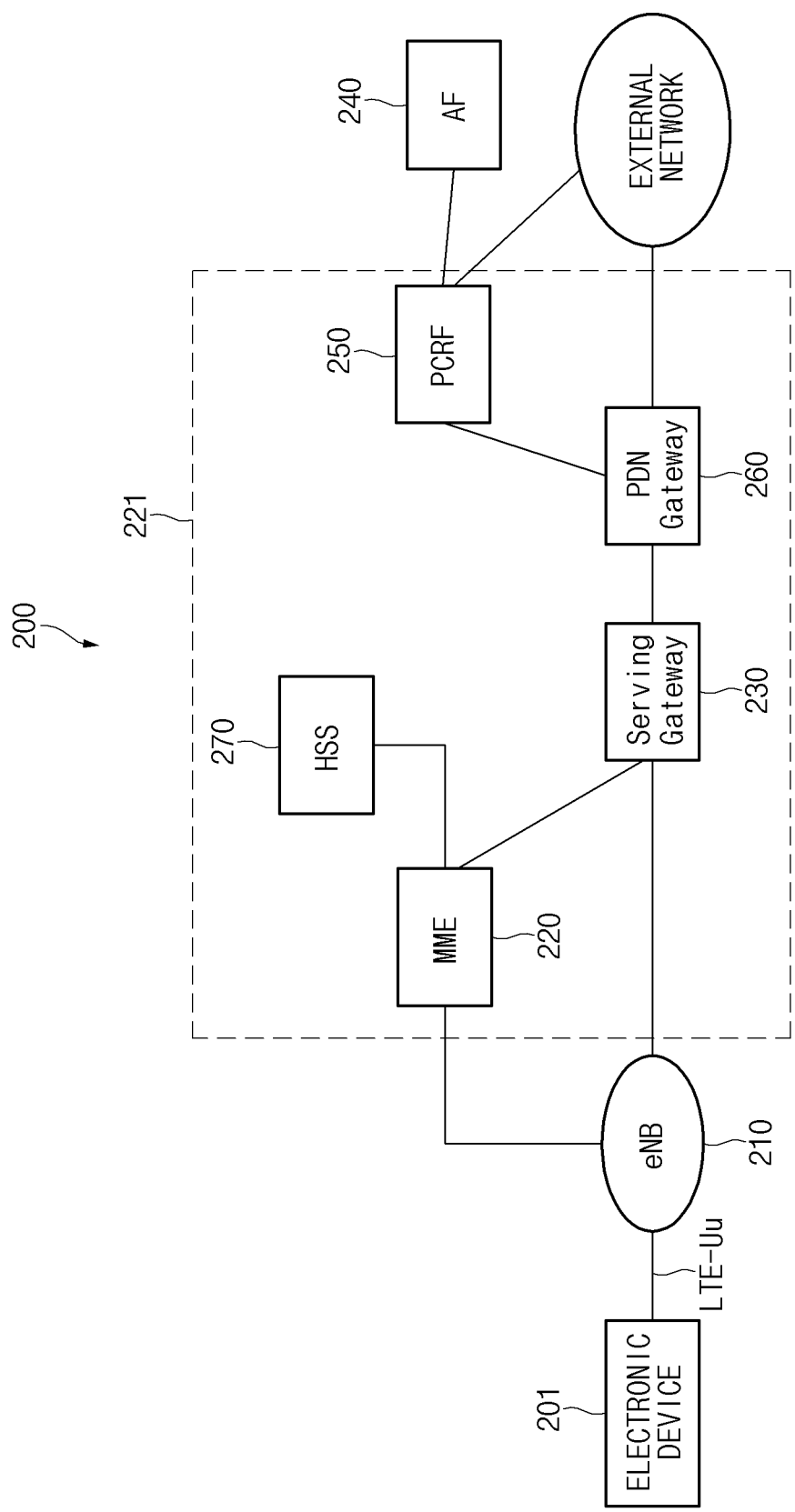
FIG. 2 is a block diagram illustrating an example structure of a long term evolution (LTE) mobile communication system according to an embodiment.

FIG. 2 is a block diagram illustrating an example structure of an LTE mobile communication system 200 according to an embodiment.

Referring to FIG. 2, a radio access network (RAN) of the LTE mobile communication system 200 according to various embodiments may include an evolved node b (eNB) 210 and an evolved packet core (EPC) 221 connected to an external network. According to an embodiment, the EPC 221 may include a mobility management entity (MME) 220, a serving-gateway (S-GW) 230, a packet data network (PDN)-gateway (P-GW) 260, a policy charging and rules function (PCRF) 250, and a home subscriber service (HSS) 270. According to various embodiments, the EPC 221 may further include a component which is not shown in FIG. 2. The electronic device 201 (e.g., the electronic device 101 of FIG. 1) may access the external network via the eNB 210 and the EPC 221.

According to various embodiments, the eNB 210 may be a node of the RAN and may correspond to a radio network controller (RNC) of a universal terrestrial radio access network (UTRAN) and a base station controller (BSC) of a global system for mobile communications (GSM) enhanced data rates for GSM evolution (EDGE) radio access network (GERAN) system. The eNB 210 may be connected with the electronic device 201 over a wireless channel and may play a similar role to a conventional RNC/BSC. According to an embodiment, the eNB 210 may simultaneously use several cells.

In the LTE mobile communication system 200 according to various embodiments, an electronic device 201 may perform a voice call based on an Internet protocol (IP). For example, the electronic device 201 may perform a packet based voice call through a real-time service such as a voice over IP (VoIP). In this case, all user traffic may be served over a shared channel, so the eNB 210 may schedule respective terminals using context information of each terminal (e.g., the electronic device 201).

Referring to FIG. 2, according to various embodiments, the MME 220 may refer, for example, to a node for controlling a control plane of the EPC 221 and may perform various functions of connecting and disconnecting a radio bearer. In the example embodiment illustrated in FIG. 2, the MME 220 may be connected with the one eNB 210. However, the various example embodiments are not limited thereto. For example, the MME 220 may be connected with a plurality of eNBs. The S-GW 230 may be a node for controlling a user plane for an LTE RAN in the EPC 221 and may operate as a mobility anchor for the electronic device 201. Furthermore, the S-GW 230 may be a device which provides a data bearer and may generate or remove a data bearer under control of the MME 220. The P-GW 260 may be a node for connecting the external network (e.g., the Internet) with the EPC 221, and may assign an IP address to the electronic device 201 and may apply a quality of service (QoS) according to the PCRF 250 to the electronic device 201. The HSS 270 may be a node having subscriber information.

According to various embodiments, the PCRF 250 may be device for controlling a policy associated with a QoS of a user. The PCRF 250 may deliver a policy and charging control (PCC) rule corresponding to the policy to the P-GW 260.

According to various embodiments, an application function (AF) 240 may be a device for exchanging information associated with an application with the user in an application level. For example, the AF 240 may be a service centralization and continuity application server (SCC AS) for supporting a voice service over a packet network. The SCC AS may perform a function of informing a domain where a terminal (e.g., the electronic device 201) which wants to make a call through terminating access domain selection (T-ADS) may perform paging.

According to various embodiments, in the LTE mobile communication system 200, a QoS may be applied for each EPS bearer. One EPS bearer may be used transmit IP flows having the same QoS requirements. According to an embodiment, the electronic device 201 may transmit voice data to the external network via the S-GW 230 and the P-GW 260 using a dedicated EPS bearer. Similarly, the electronic device 201 may receive voice data from the external network using the dedicated EPS bearer.

According to an embodiment, the electronic device 201 may establish a default bearer for data transmission and may establish a separate default bearer for voice data. Furthermore, the electronic device 201 may establish a dedicated bearer on a default bearer for voice to perform a voice call. For example, the electronic device 201 may transmit and receive a signal associated with communication control through a default bearer for voice transmission and may transmit and receive voice data through a dedicated bearer. For example, the electronic device 201 may verify data associated with a packet based voice call using a dedicated bearer for voice transmission.

According to an embodiment, the electronic device 201 may transmit data except for voice data through a default bearer for data transmission, during a packet based voice call. For example, the electronic device 201 may transmit a voice through a dedicated bearer and may transmit data through a default bearer for data transmission. Thus, the voice and the data may be transmitted using the different bearers.

Hereinafter, referring to FIG. 3, a description will be given of an example method for controlling transmission of data during a packet based voice call in the electronic device 201 according to an embodiment. For convenience of description, it is assumed that the electronic device 201 performs a packet based voice call (e.g., VoLTE) in the LTE mobile communication system 200 described with reference to FIG. 2. However, example embodiments below are not limited to the LTE mobile communication system 200. For example, the embodiments below may be applied, for example, and without limitation, to a $3^{rd}$ generation partnership project (3GPP)$5^{th}$ generation (5G) communication system or another packet based wireless communication network.

Figure 3:
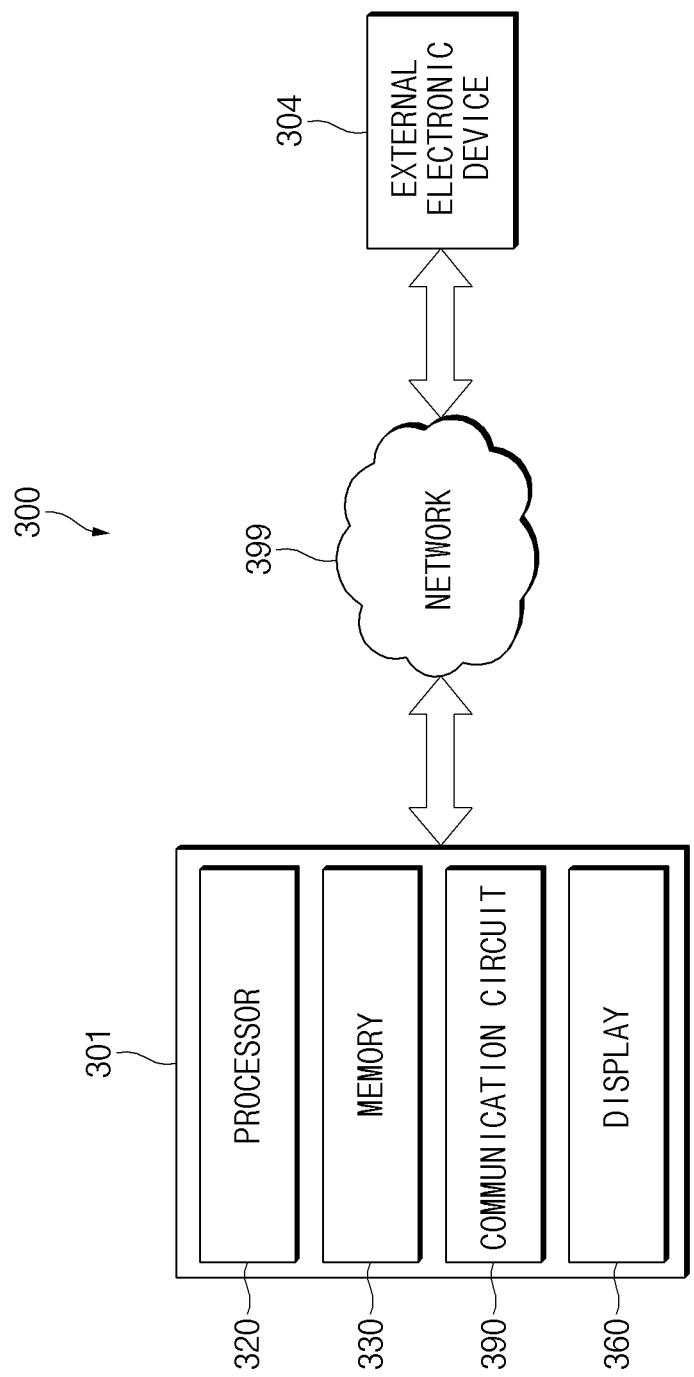
FIG. 3 is a block diagram illustrating an example configuration of an electronic device in a wireless environment according to an embodiment.

FIG. 3 is a block diagram illustrating an example configuration 300 of an electronic device 301 in a wireless environment according to an embodiment.

Referring to FIG. 3, according to an embodiment, the electronic device 301 (e.g., an electronic device 101 of FIG. 1 or an electronic device 201 of FIG. 2) may include a processor (e.g., including processing circuitry) 320 (e.g., a processor 120 and/or a communication module 190 of FIG. 1), a memory 330 (e.g., a memory 130 of FIG. 1), a communication circuit 390 (e.g., the communication module 190 of FIG. 1), and a display 360 (e.g., a display device 160 of FIG. 1).

The processor 320 may be operatively connected with the memory 330, the communication circuit 390, and the display 360 and may include various processing circuitry to control operations of the components of the electronic device 301. According to an embodiment, the processor 320 may include, for example, and without limitation, an application processor (e.g., the processor 120 of FIG. 1). According to another embodiment, the processor 320 may include, for example, and without limitation, a communication processor (e.g., at least a part of the communication module 190 of FIG. 1). For example, the processor 320 may include, for example, and without limitation, a cellular processor and/or another communication processor (e.g., wireless-fidelity (Wi-Fi) processor or the like). According to another embodiment, the processor 320 may include, for example, and without limitation, an application processor and a communication processor, or the like.

The memory 330 may be operatively connected with the processor 320 and may store instructions for controlling the processor 320. According to an embodiment, the memory 330 may store instructions causing the processor 320 to perform operations described below in the processor 320 or the electronic device 301.

The communication circuit 390 may provide communication with an external electronic device 304 (e.g., an electronic device 104 of FIG. 1) over a network (e.g., a network 199 of FIG. 1). According to an embodiment, the communication circuit 390 may be configured with at least one communication circuit. For example, the communication circuit 390 may include, for example, and without limitation, at least one of a communication circuit for LTE communication, a communication circuit for millimeter wave (mmWave) communication, and/or a communication circuit for Wi-Fi communication, or the like.

According to an embodiment, the network 399 may be a packet based wireless network. For example, the network 399 may be an LTE communication network. For another example, the network 399 may be a Wi-Fi network.

The electronic device 301 may transmit a data packet together with transmitting a voice packet for a voice call. In this case, as a transmit packet increases in quantity, there may be a low probability that transmission of a voice packet will succeed. The electronic device 301 may enhance quality of a packet based voice call by, for example, controlling transmission of data according to embodiments described below.

According to an embodiment, the processor 320 may verify or obtain a communication state using the communication circuit 390 during a packet based voice call. The processor 320 may be configured to, when the communication state meets a specified first condition, stop transmitting data associated with at least one of a plurality of background applications which operate in a background of an operating system (OS) (e.g., Android, Tizen, Bada, iOS, or the like) of the electronic device 301. According to various embodiments, for example, the specified first condition may include, for example, and without limitation, at least one of a reference signal received power (RSRP) less than a specified first range or a block error rate (BLER) greater than or equal to a specified second range, or the like.

According to an embodiment, the processor 320 may be configured to verify or obtain a communication state at a specified period using the communication circuit 390 during a packet based voice call and resume transmitting stopped data when the communication state meets a specified second condition. For example, and without limitation, the specified second condition may include at least one of an RSRP greater than or equal to a specified third range or a BLER less than a specified fourth range.

According to an embodiment, the processor 320 may be configured to stop transmitting data associated with at least one background application according to a specified priority based, for example, and without limitation, on at least one of a type of the plurality of background applications or a type of data associated with the plurality of background applications.

According to an embodiment, the processor 320 may be configured to, when the communication state meets the specified first condition and when an application associated with a packet based voice call operates in the background of the OS of the electronic device 301, stop transmitting data associated with at least one background application except for the application associated with the packet based voice call.

According to an embodiment, the processor 320 may be configured to transmit the stopped data associated with the at least one background application over a wireless local area network (WLAN).

According to an embodiment, the processor 320 may be configured to obtain information associated with the plurality of background applications from an application processor (e.g., the processor 120) of the electronic device 301. For example, a voice call may be an incoming call or an outgoing call.

According to an embodiment, the processor 320 may be configured to provide a notification that transmission of data associated with at least one background application is stopped, through the display 360.

Hereinafter, a description will be given of operations of the electronic device 301 according to an example embodiment with reference to FIG. 4.

Figure 4:
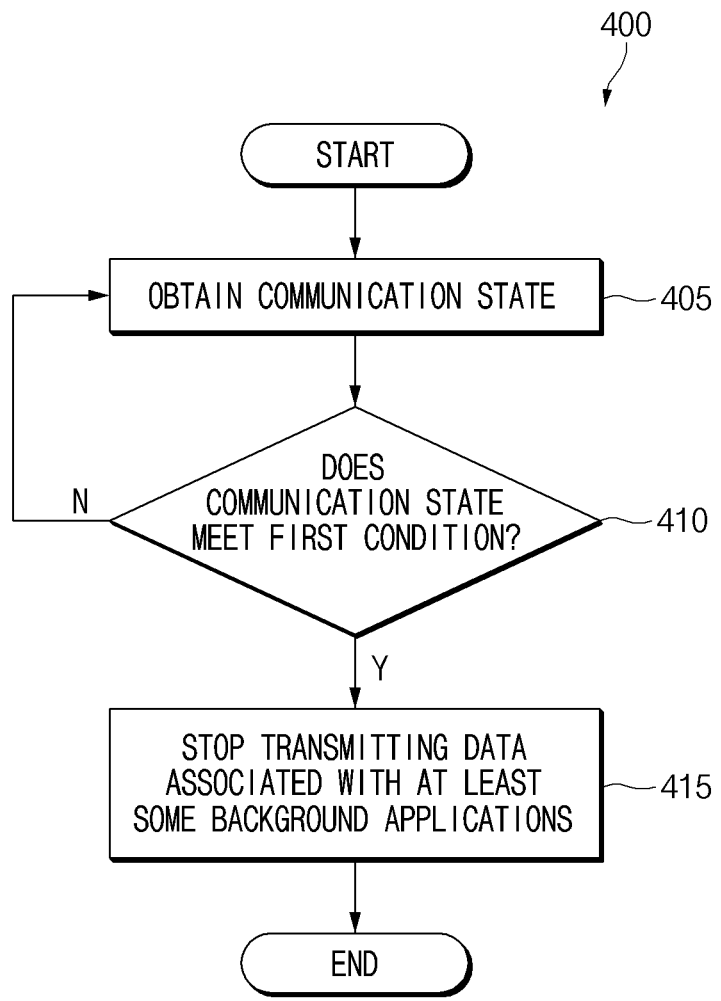
FIG. 4 is a flowchart illustrating an example method for transmitting data according to various embodiments.

FIG. 4 is a flowchart 400 illustrating an example method for transmitting data according to various embodiments.

Referring to FIG. 4, in operation 405, a processor 320 of an electronic device (e.g., an electronic device 301 of FIG. 3) according to various embodiments may verify or obtain a communication state using a communication circuit 390 of FIG. 3. For example, while a packet based voice call is performed, the processor 320 may verify or obtain a communication state. The packet based voice call may be an incoming call or an outgoing call.

According to an embodiment, the communication state may include, for example, and without limitation, a BLER and/or an RSRP.

According to an embodiment, the BLER may refer, for example, to the ratio of an erroneous block to a transmitted transport block. According to an embodiment, the processor 320 may transmit a signal (e.g., a physical uplink shared channel (PUSCH)) to an eNB (e.g., an eNB 210 of FIG. 2) using the communication circuit 390 and may receive an acknowledgement/negative acknowledgement (ACK/NACK) to a transmit signal from the eNB. For example, the processor 320 may receive an ACK/NACK to transport blocks from the eNB over a physical hybrid automatic repeat request (HARQ) indicator channel (PHICH). For example, the processor 320 may obtain a BLER based at least on an ACK/NACK received from the eNB.

According to an embodiment, the processor 320 may obtain an RSRP from a reference signal received from the eNB using the communication circuit 390. For example, the reference signal may be a cell-specific reference signal. For another example, the reference signal may be a UE-specific reference signal.

According to an embodiment, the communication state may further include a received signal strength indicator (RSSI) and/or a reference signal received quality (RSRQ).

According to an embodiment, the processor 320 may periodically verify or obtain a communication state. For example, while a packet based voice call is performed, the processor 320 may periodically verify a communication state. According to another embodiment, the processor 320 may verify a communication state based on an indication from the eNB.

In operation 410, according to various embodiments, the processor 320 may determine whether the communication state meets a specified first condition. According to an embodiment, the first condition may refer, for example, to communication quality less than or equal to a specific range. For example, the first condition may refer to an RSRP less than or equal to a specified first range. For another example, the first condition may refer to a BLER greater than or equal to a specified second range. For another example, the first condition may refer to an RSRP less than or equal to the specified first range and a BLER greater than or equal to the specified second range.

According to an embodiment, when the communication state does not meet the specified first condition, the processor 320 may verify the communication state. For example, the processor 320 may perform operation 405 at a specified period after operation 410. For another example, the processor 320 may perform operation 405 based on an indication of the eNB, received after operation 410.

In operation 415, according to various embodiments, when the communication state meets the specified first condition, the processor 320 may stop transmitting data associated with at least some background applications. For example, the background applications may refer to at least some of applications which are operating except for applications which operate in a foreground on the OS of the electronic device 301.

According to an embodiment, in operation 415, reception of the data associated with the background applications may be stopped as well as the transmission of the data associated with the background applications. For example, the processor 320 may ensure quality of a packet based voice call by stopping transmitting and receiving the data associated with the background applications depending on a communication environment.

According to an embodiment, in operation 415, the processor 320 may determine whether data to be transmitted is background data (e.g., data associated with a background application). When the data is the background data, the processor 320 may stop transmitting the data.

According to another embodiment, the processor 320 may determine to stop transmitting and/or receiving data, based on capability of the electronic device 301. For example, in operation 415, the processor 320 may determine to stop transmitting and/or receiving data, based on a battery state of the electronic device 301. For another example, the processor 320 may determine to stop transmitting and/or receiving data, depending on whether the communication circuit 390 supports full-duplex communication or half-duplex communication.

According to another embodiment, the processor 320 may determine to stop transmitting and/or receiving data, based on a communication environment. For example, when the network 399 operates according to time division duplex (TDD) communication, the processor 320 may fail to stop receiving data.

Hereinafter, a description will be given of operations in operation 415 according to an example embodiment with reference to FIG. 5.

Figure 5:
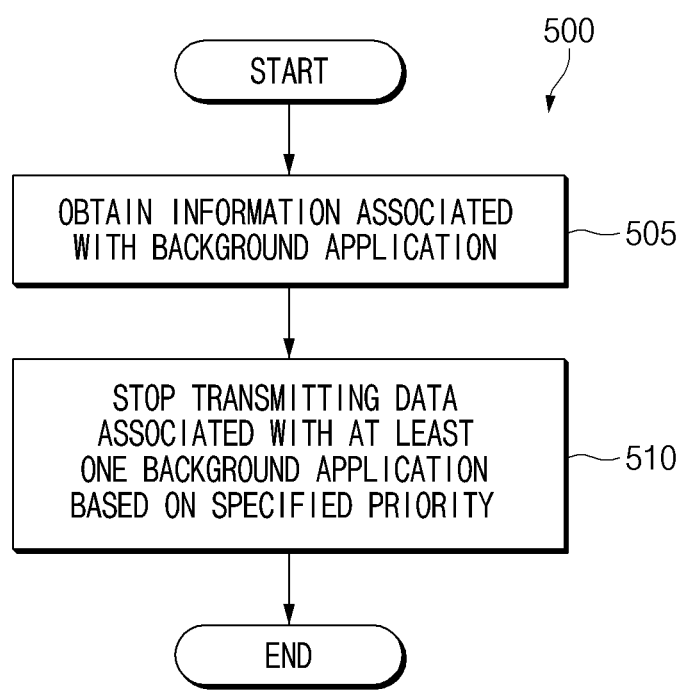
FIG. 5 is a flowchart illustrating an example method for stopping transmitting data according to various embodiments.

FIG. 5 is a flowchart 500 illustrating an example method for stopping transmitting data according to various embodiments.

Referring to FIG. 5, operation 505 and/or operation 510 of FIG. 5 according to an embodiment may be included in operation 415.

According to an embodiment, in operation 505, a processor (e.g., a processor 320 of FIG. 3) may obtain information associated with a background application. According to an embodiment, the processor 320 may obtain information associated with a background application from an application processor. For example, the processor 320 may obtain information associated with an application having data to be transmitted or an application associated with transmitted data. For another example, the processor 320 may obtain information associated with all applications which are operating. For another example, the processor 320 may obtain information associated with applications which are operating in a background or foreground.

According to an embodiment, the information associated with the application may include information explicitly or implicitly indicating whether a corresponding application is a background application. For example, the information associated with the application may include information indicating that the corresponding application is a background or foreground application. For another example, the information associated with the application may include information indicating that the corresponding application is a background application. An application which is not indicated as the background application may be regarded as a foreground application. For another example, the information associated with the application may include information indicating that the corresponding application is a foreground application. An application which is not indicated as the foreground application may be regarded as a background application.

According to an embodiment, the processor 320 may perform operation 505 subsequent to operation 410. According to another embodiment, the processor 320 may perform operation 505 at any time while a voice call is performed (e.g., when the voice call starts).

In operation 510, according to various embodiments, the processor 320 may stop transmitting data associated with at least one background application based on a specified priority. Furthermore, the processor 320 may stop transmitting and receiving the data associated with the at least one background application based on the specified priority. According to an embodiment, the priority may be set based on a type of an application, a type of transmit data, a size of the transmit data, billing information, and/or a transmission rate of the transmit data. For example, the priority may be preset according to an application. For example, data including an ACK/NACK may have a higher priority than another type of data. For example, data with a small size may have a higher priority than data with a large size, or data with a large size may have a higher priority than data with a small size. For example, data associated with billing (e.g., pay-per-download data, or the like) may have a higher priority than the other data. For example, data with a currently high transmission rate may have a higher priority than the other data.

According to another embodiment, in operation 510, the processor 320 may stop transmitting and/or receiving data associated with all background applications. For example, when an application (e.g., a phone application) associated with a packet based voice call is operating in a background, the processor 320 may stop transmitting data of an application associated with a voice call depending on a communication state.

In the above-mentioned embodiments, the processor 320 according to an embodiment may stop transmitting and/or receiving data associated with a background application pursuant to (based on) an exception rule. For example, when an application associated with a voice call is operating in a background, the processor 320 may fail to stop transmitting and/or receiving data associated with the voice call. For another example, the processor 320 may fail to stop transmitting and/or receiving data including an ACK/NACK. For another example, the processor 320 may fail to stop transmitting and/or receiving data associated with billing (e.g., pay-per-download data, or the like).

Hereinafter, a description will be given of a background application according to an example embodiment with reference to FIG. 6.

Figure 6:
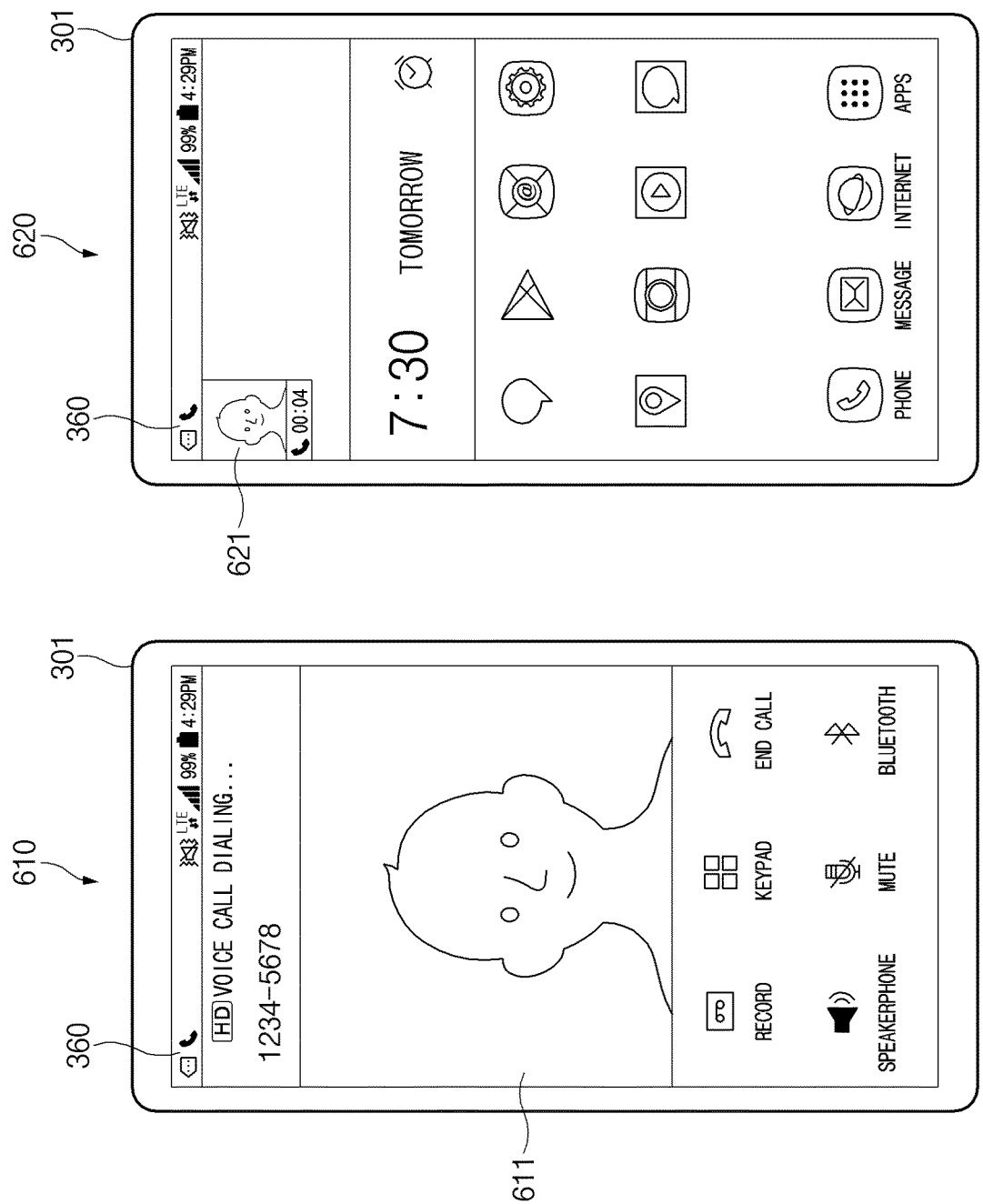
FIG. 6 is a diagram illustrating an example user interface of an application associated with a voice call according to an embodiment.

FIG. 6 is a diagram illustrating an example first user interface 611 and a second user interface 621 of an application associated with a voice call according to an embodiment.

In an embodiment of FIG. 6, a phone application is provided as an example for describing a background application. However, the various example embodiments described below are not limited to the phone application.

According to an embodiment, in a first state 610, an electronic device (e.g., the electronic device 301 of FIG. 3) may display the first user interface 611 corresponding to the phone application on a display 360 of FIG. 3. According to an embodiment, a processor 320 of FIG. 3 may determine an application currently displayed on the display 360 as a foreground application.

According to an embodiment, in a second state 620, the electronic device 301 may display the second user interface 621 corresponding to the phone application on the display 360. According to an embodiment, when the second user interface 621 is displayed on the display 360 or when the first user interface 611 is not displayed on the display 360, the processor 320 may determine that an application is a background application.

According to an embodiment, the processor 320 may determine whether an application performs a background or foreground operation based on whether the application is displayed on the display 360. According to another embodiment, the processor 320 may determine whether an application performs a background or foreground operation based on whether an interface (e.g., the first user interface 611) corresponding to the application is displayed on the entire display 360. According to another embodiment, the processor 320 may determine whether an application performs a background or foreground operation based on whether a user interface (e.g., the first user interface 611) corresponding to a foreground is displayed on the display 360.

According to an embodiment, the electronic device 301 may support divided screens. For example, when a user interface (e.g., the first user interface 611) is displayed on all or most (at a specified rate and/or area or more) of one of the divided screens, the processor 320 may determine that a corresponding application operates in a foreground.

According to an embodiment, the processor 320 may turn off the display 360 based on an adjacent sensor (e.g., a sensor module 176 of FIG. 1). Although the display 360 is turned off, the processor 320 may determine whether an application operates in a background or foreground to be the same as a turn-on state of the display 360.

In various example embodiments, the processor 320 may determine a foreground or background application based on whether an interface associated with an application is displayed on the display 360. However, the determining of the background or foreground application is not limited thereto. For example, the processor 320 may determine a background application based on an indicator for an application which is currently displayed on the display 360 or will be displayed on the display 360.

According to an embodiment, the processor 320 may store and/or update a list of applications which are operating in and/or to a memory 330 of FIG. 3. For example, the processor 320 may determine a foreground/background application based on an order of the applications on the list.

In various embodiments, the processor 320 may be an application processor (e.g., a processor 120 of FIG. 1). For example, information associated with a background application determined by the application processor (e.g., the processor 120) may be delivered to a communication processor (e.g., a communication module 190 of FIG. 1).

Hereinafter, a method for resuming transmitting and receiving blocked data according to various example embodiments will be described with reference to FIG. 7.

Figure 7:
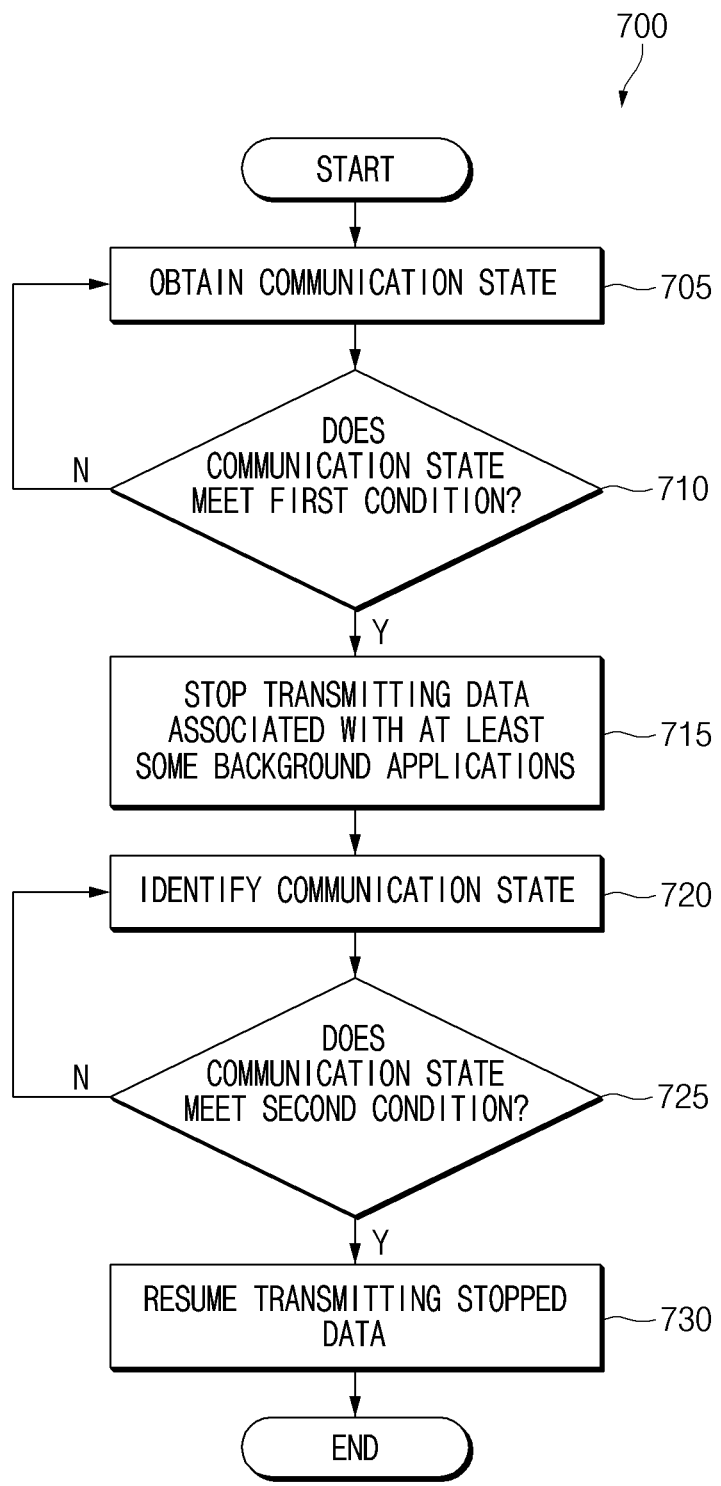
FIG. 7 is a flowchart illustrating an example method for resuming transmitting data according to various embodiments.

FIG. 7 is a flowchart 700 illustrating an example method for resuming transmitting data according to various embodiments.

For convenience of description, a description of repeated operations may not be repeated. For example, operations 705, 710, and 715 of FIG. 7 may refer to a description of operations 405, 410, and 415 of FIG. 4. Hereinafter, a description will be given of operations after transmission (and/or reception) of data associated with at least one background application is stopped in operation 715.

According to various embodiments, in operation 720, a processor (e.g., a processor 320 of FIG. 3) may verify a communication state. For example, the processor 320 may verify a communication state in the same manner as operation 405. According to an embodiment, the processor 320 may periodically perform operation 720.

According to an embodiment, in operation 725, the processor 320 may determine whether the communication state meets a specified second condition. For example, the specified second condition may refer to communication quality greater than or equal to a specified range. According to an embodiment, the specified second condition may be set in the same manner as the specified first condition. According to another embodiment, the specified second condition may be a condition capable of ensuring better communication quality than the specified first condition of operation 710. Communication quality of a packet based communication call may be ensured by setting the second condition to correspond to better communication quality than the first condition. According to an embodiment, for example, the second condition may refer to an RSRP greater than a specified third range. For another example, the second condition may refer to a BLER less than a specified fourth range. For another example, the second condition may refer to an RSRP greater than a specified first range and a BLER less than a specified second range.

According to various embodiments, in operation 730, when the communication state meets the specified second condition, the processor 320 may resume transmitting the stopped data. According to an embodiment, the processor 320 may resume transmitting and/or receiving the stopped data. For example, when resuming transmitting data to an eNB, the processor 320 may resume transmitting the data from a data packet, transmission of which is stopped, or may resume transmitting the data from a packet subsequent to the last packet in which an ACK is received. For another example, the processor 320 may transmit the entire related data packet from the beginning. For another example, the processor 320 may receive the other packets from the eNB by transmitting a NACK to a packet, reception of which is stopped, to the eNB or transmitting a retransmission request. For another example, the processor 320 may request the eNB to retransmit the entire data associated with a packet, reception of which is stopped.

In various embodiments, transmission and/or reception of data associated with a background application may be stopped and resumed based on the communication state. According to an embodiment, the data associated with the background application may be offloaded onto another packet based wireless network.

Figure 8:
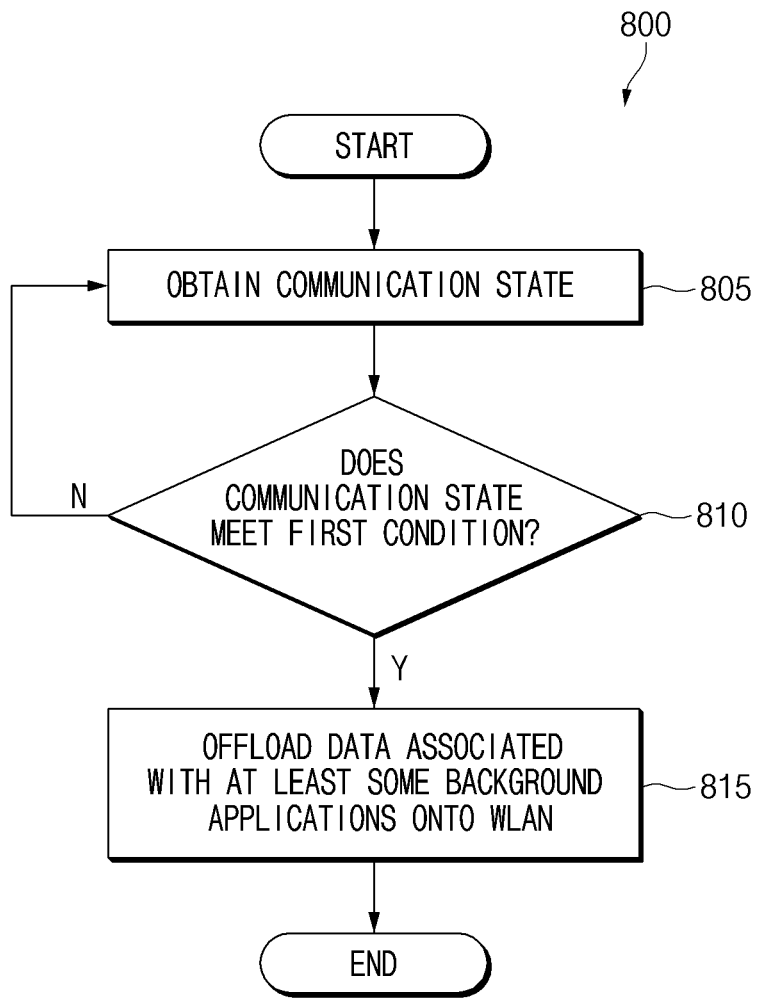
FIG. 8 is a flowchart illustrating an example method for offloading transmission of data according to various embodiments.

FIG. 8 is a flowchart 800 illustrating an example method for offloading transmission of data according to various embodiments.

For convenience of description, a description of repeated operations may not be repeated. For example, operations 805 and 810 of FIG. 8 may refer to a description of operations 405 and 410 of FIG. 4.

According to various embodiments, in operation 815, when a communication state meets a first condition, a processor (e.g., a processor 320 of FIG. 3) may offload data associated with at least some background applications onto a wireless local area network (WLAN) (e.g., Wi-Fi). For example, the processor 320 may select data to be offloaded in a similar manner to stop transmitting data associated with a background application in operation 510 of FIG. 5. According to an embodiment, the processor 320 may transmit a signal for offloading background data onto an eNB.

Figure 9:
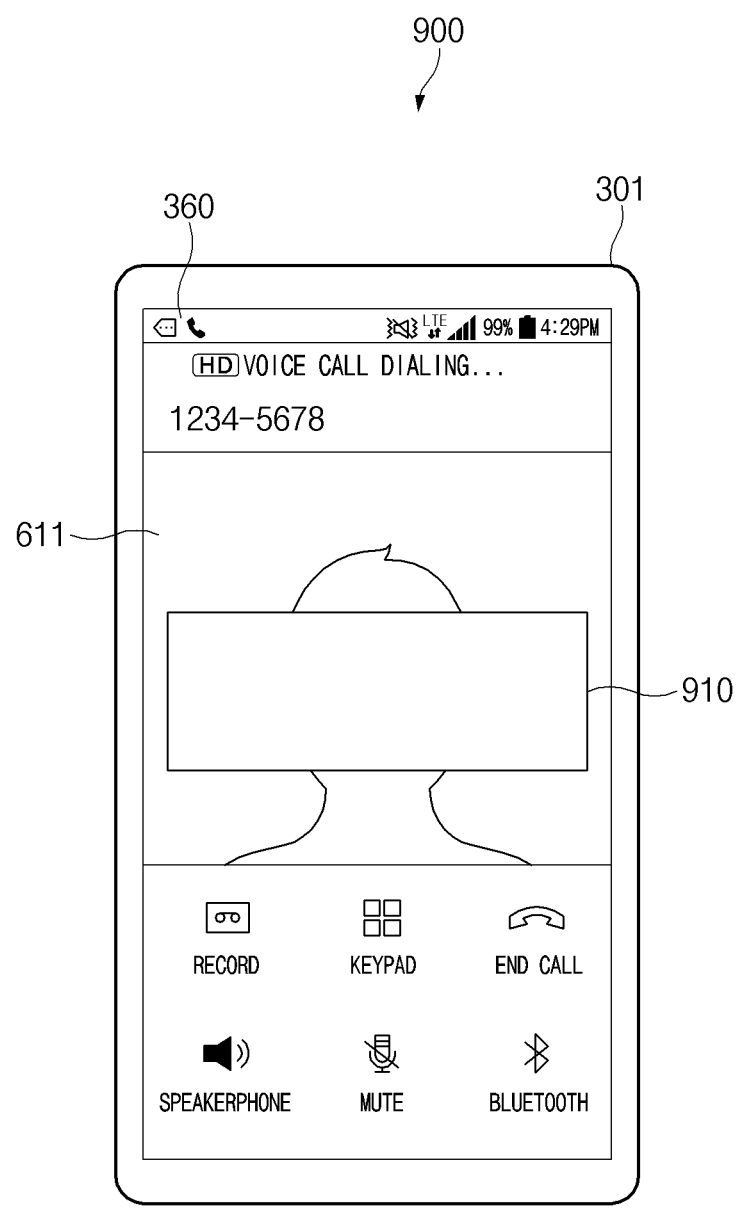
FIG. 9 is a diagram illustrating an example notification interface according to an embodiment.

FIG. 9 is a diagram illustrating an example notification interface 900 according to an embodiment.

According to an embodiment, when transmission and/or reception of data is stopped in, for example, operation 415, 510, or 715, a processor (e.g., a processor 320 of FIG. 3) may display a notification indicating that the transmission and/reception of the data is stopped on a display 360.

Referring to FIG. 9, according to various embodiments, the processor 320 may display a first user interface (e.g., a first user interface 611 of FIG. 6) corresponding to an application (e.g., a phone application) associated with a voice call on the display 360. When transmission and/or reception of data is stopped, the processor 320 may display a third user interface 910 indicating that the transmission and/or reception of the data is stopped on the display 360. For example, the third user interface 910 may be displayed as a pop-up image on the first user interface 611.

According to an embodiment, the third user interface 910 may include information about an application associated with stopping transmitting and/or receiving data. For example, the third user interface 910 may include a name and/or icon of the application associated with stopping transmitting and/or receiving the data.

According to an embodiment, the third user interface 910 may include at least one input for requesting to verify that transmission and/or reception of data is stopped. For example, the third user interface 910 may be used to prompt a user to stop transmitting and/or receiving data. For example, the processor 320 may stop transmitting and/or receiving data based on an input for at least one input means (e.g., an OK button) of the user.

In an embodiment of FIG. 9, the notification interface 900 may be provided through the third user interface 910 displayed on the display 360. However, the notification interface 900 is not limited to a visual notification. According to an embodiment, the processor 360 may provide, for example, and without limitation, a visual, audible, and/or tactile notification. For example, the notification interface 900 may include a sound, a voice, vibration, and/or an image corresponding to a notification. For another example, the notification interface 900 may be provided through an external electronic device 304 of FIG. 3.

While the present disclosure has been illustrated and described with reference to various example embodiments thereof, it will be understood by those skilled in the art that various changes in form and details may be made therein without departing from the spirit and scope of the present disclosure as defined, for example, by the appended claims and their equivalents.

What is claimed is:

1. An electronic device, comprising:
   a display;
   at least one communication circuit; and
   at least one processor configured to control the display and the at least one communication circuit,
   wherein the at least one processor is operable to:
      control the at least one communication circuit to perform a voice over LTE (Long Term Evolution) call (VoLTE call) and data communication associated with a plurality of background application over the PS network over a packet switched (PS) network, the plurality of background applications operating at a background of an operating system of the electronic device;
      periodically identify a communication state of the PS network during the VoLTE call based on a specified priority; and
      when the communication state is lower than a threshold set based on communication quality of the VoLTE, control the at least one communication circuit to stop transmitting data associated with at least one of a plurality of background applications and data associated with an application associated with the VoLTE call during the VoLTE call;
      when the communication state meets a specified condition, control the at least one communication circuit to resume transmitting the uplink data;
      wherein the specified condition comprises at least one of: a reference signal received power greater than or equal to a specified third range and/or a block error rate less than a specified fourth range,
      wherein the specified priority is set based on at least one of: a type of the plurality of background applications and/or a type of data associated with the plurality of background applications, and
      wherein the communication state lower than the threshold comprises a reference signal received power less than a specified first range and/or a block error rate greater than or equal to a specified second range.

2. The electronic device of claim 1, wherein the at least one processor is operable to:
   control the at least one communication circuit to stop transmitting the uplink data associated with the at least one background application based on a specified priority set based on at least one of: a type of the plurality of background applications and/or a type of data associated with the plurality of background applications.

3. The electronic device of claim 1, wherein the application associated with the VoLTE call operates in the background of the operating system.

4. The electronic device of claim 1, wherein the at least one processor is operable to:
   control the at least one communication circuit to transmit the stopped data associated with the at least one background application over a wireless local area network.

5. The electronic device of claim 1, wherein the at least one processor is operable to:
   obtain information about the plurality of background applications from an application processor of the electronic device.

6. The electronic device of claim 1, wherein the VoLTE call includes one of an incoming call or an outgoing call.

7. The electronic device of claim 1, wherein the at least one processor is operable to:
   provide a notification via the display indicating that the transmission of the data associated with the at least one background application is stopped.

8. A method for controlling transmission of data in an electronic device, the method comprising:
   performing a voice over LTE (long term evolution) call (VoLTE call) data communication associated with a plurality of background application over the PS network over a packet switched (PS) network, the plurality of background applications operating at a background of an operating system of the electronic device;
   periodically identifying a communication state of the PS network during the VoLTE call based on a specified priority;
   when the communication state is lower than a threshold, stopping transmitting data associated with at least one of a plurality of background applications and data associated with an application associated with the VoLTE call during the VoLTE call;
   when the communication state meets a specified condition, resuming transmission of the uplink data;
   wherein the specified condition comprises at least one of: a reference signal power greater than or equal to a specified third value and/or a block error rate less than a specified fourth value;
   wherein the specified priority is set based on at least one of: a type of the plurality of background applications and/or a type of data associated with the plurality of background applications, and
   wherein the communication state lower than the threshold comprises a reference signal power less than a specified first value and/or a block error rate greater than or equal to a specified second value.

9. The method of claim 8, wherein the stopping transmitting the data associated with the at least one background application comprises:
   stopping transmitting the data associated with the at least one background application based on a specified priority set based on at least one of: a type of the plurality of background applications and/or a type of data associated with the plurality of background applications.

10. The method of claim 8, wherein the application associated with the VoLTE call operates in the background of the operating system.

11. The method of claim 8, further comprising:
transmitting the stopped data associated with the at least one background application over a wireless local area network.

12. The method of claim 8, further comprising:
obtaining information about the plurality of background applications from an application processor of the electronic device.

13. The method of claim 8, wherein the VoLTE call is one of an incoming call or an outgoing call.

14. The method of claim 8, further comprising:
providing a notification indicating that the transmission of the data associated with the at least one background application is stopped.

* * * * *